United States Patent Office 2,853,454
Patented Sept. 23, 1958

2,853,454

TREATMENT OF SILICA GEL

Ivor W. Mills, Glenolden, Pa., assignor to Sun Oil Company, Philadelphia, Pa., a corporation of New Jersey No Drawing. Application July 22, 1953
Serial No. 369,737

8 Claims. (Cl. 252—413)

This invention relates to a method of increasing the adsorbent activity of silica gel. More particularly, it relates to a method of restoring the activity of silica gel which has become dehydrated with respect to its structurally combined water content, such as by subjection to temperatures in substantial excess of 400° F.

It is known in the art that silica gel may contain water in varying proportions, and that water may be associated with the gel in either of two distinct manners: by structural combination with the gel or by adsorption on the gel.

Silica gel may comprise structurally combined water in amount up to about four percent. Water associated with the gel in amount exceeding this maximum amount of structurally combined water will necessarily comprise adsorbed water.

The activity or efficacy of silica gel in its known uses as an adsorbent is at least in part a function of its water content. In general, this activity increases with increasing structurally combined water content and decreases with increasing adsorbed water content.

Freshly precipitated silica gel contains the maximum possible amount of structurally combined water and also contains some adsorbed water. Customary practice in preparing silica gel for use as an adsorbent comprises removing adsorbed water from freshly precipitated gel without removing any substantial amount of its structurally combined water content. This may be accomplished by heating the gel under vacuum for a prolonged period at a temperature not greater than 400° F. For example, the gel may be heated to about 350° F. for one hour at 5 millimeters of mercury absolute pressure. Heating silica gel to temperatures substantially in excess of 400° F., however, results in a decrease in its structurally combined water content, that is, a decrease to substantially below four percent in its total water content.

As silica gel is used as an adsorbent, contaminants are frequently deposited thereon. Removal of these contaminants is often effected by heating the gel to temperatures above 400° F. with the result that the gel's structurally combined water content decreases, and as a consequence, its efficacy in the adsorption process declines. In customary practice, the activity of the gel is allowed to decrease to the point where it becomes more economical to replace the gel than to allow its efficiency to decrease further.

I have discovered that the activity of silica gel, which has been decreased in activity through subjection to such elevated temperatures that structurally combined water has been removed, may be substantially increased by bringing the gel into contact with water or aqueous hydrochloric acid in liquid phase for a prolonged period, such as more than half an hour, at a temperature not substantially above 400° F. and then removing from the gel water other than structurally combined water.

Thus, silica gel which has become reduced in structurally combined water content and consequently in activity through use as an adsorbent may be restored to a higher adsorbent activity by treating such gel with water alone in liquid phase for a time sufficient to effect a substantial increase in activity. The resulting gel will contain adsorbed water, which may be removed, as previously described, by subjection to a vacuum at elevated temperatures insufficient to cause substantial removal of structurally combined water.

In another embodiment of the invention, aqueous hydrochloric acid in liquid phase may be used instead of water for reactivation of silica gel. Generally speaking, when acid is used, somewhat less time is required to effect a given degree of reactivation than when water alone is used.

When water alone is used for reactivation, the time of contact with the gel should be greater than half an hour, since the degree of reactivation does not become significantly great until after half an hour of contact time has elapsed, and preferably within the range from 1 to 6 hours.

When hydrochloric acid is used, substantially the same conditions of contact time should be met, although, as previously stated, somewhat less time is required with acid for a given degree of reactivation. It is preferred that the concentration of hydrogen chloride in the acid be within the range 0.1–3.6% by weight, since using concentrations above 3.6% does not result in any substantial increase in the degree of reactivation obtained over that obtained with 3.6% concentration; however, any concentration up to saturation, or about 45%, may be used.

The temperature of the water or acid is relatively unimportant. Reactivations conducted at room temperature and at elevated temperatures give substantially the same results.

The invention is applicable generally to processes wherein organic material is contacted with silica gel at a temperature not substantially greater than 400° F. in order to effect adsorption of the organic material in whole or in part on the silica gel. In such contacting, physical action, e. g. adsorption, occurs to the substantial exclusion of any chemical reaction or decomposition of the organic material. Typical adsorption processes are the well-known cyclic adsorption-desorption processes, as disclosed for example in Chemical Engineering Progress, vol. 48, No. 6, pages 276–280, June 1952, and in Petroleum Refiner, vol. 31, No. 5, pages 109–113, May 1952. In such processes, the gel is successively contacted with charge material, then with desorbent liquid or liquids, then with charge material again. Although this cycle may be repeated a number of times at temperatures below 400° F., e. g. room temperature, there is a tendency for contaminating materials to accumulate on the gel, and eventually it may become necessary to use temperatures above 400° F. in order to drive off such contaminating materials. The use of such temperatures tends to decrease the adsorptive activity of the gel. The process of the present invention can be used to effect reactivation of silica gel which has been previously heated even to quite high temperatures, e. g. up to about 1500° F.

According to the present invention, it has surprisingly been found that the activity of the gel can, after such heating, be increased substantially by contacting the gel with an aqueous material and then heating the gel below 400° F. and above the boiling point of water at the pressure employed in order to vaporize adsorbed water. Preferred conditions for such heating include the use of reduced pressure not substantially greater than 100 mm. of Hg absolute and the use of temperatures in the range from 200° F. to 400° F., more preferably from 300° F. to 400° F. Preferred heating periods are those in the range from ½ to 10 hours. The gel which has been water-treated and then dried according to the invention has been found to have greater activity for selective adsorption when reused in such process at a temperature not greater than 400° F. Since heating above 400° F. tends to destroy the beneficial effects of the water treatment, each such heating is preferably followed by an additional water treatment.

Adsorption processes to which the process of the invention may be applied include the well-known absorptive separation processes. Such processes include the selective adsorption of highly polar organic compounds from less polar or non-polar organic compounds, the separation of hydrocarbons according to chemical type, etc. Generally speaking, aromatic hydrocarbons are more readily adsorbed than olefins and olefins more readily than saturated hydrocarbons, so that separation of these types by selective adsorption on silica gel can be effected. Various mixtures of organic materials, e. g. petroleum fractions such as gasoline, naphtha, etc. can be contacted with silica gel to effect selective adsorption of the more readily adsorbed constituents thereof.

Any suitable manner of contacting the organic material with the silica gel can be employed. The organic material can be percolated in liquid phase through a stationary bed of the gel in granular form. Alternatively, the gel in granular form can be continuously transported through a plurality of zones, being contacted with organic charge material in one zone, with desorbent or desorbents in another zone or zones, then with charge material again in the first zone, etc. The manner of removing adsorbed charge material from the gel is not necessarily by use of a liquid desorbent; heating, blowing with gas such as steam or flue gas, or a combination of these can also be employed.

If organic liquid desorbents are used for removal of of adsorbed materials, they may be chosen according to principles well known in the art from among numerous desorbents as known in the art. U. S. Patent 2,585,490 to John L. Olsen discloses numerous suitable desorbents and the manner of choosing desorbent for a given process.

If heating or steaming is used to remove adsorbed material from the gel, such heating or steaming is preferably performed at a temperature not substantially greater than 400° F. during the ordinary cyclic operation. Only when relatively non-volatile contaminants have accumulated to a substantial degree should the cyclic operation be interrupted and the gel heated to higher temperatures, substantially above 400° F., for removal of such contaminants. After such heating, the gel is treated with water according to the invention prior to resumption of the cyclic operation at a temperature not substantially above 400° F.

The water treatment according to the invention is effected as a step additional to any step involving removal of adsorbed material from the gel. Thus, in the event that water or steam is used to effect removal of adsorbed material from the gel, there is, according to the present invention, an additional water treatment after such removal and after the gel has been heated above 400° F. for additional removal of adsorbed material.

The following example illustrates the invention:

Adsorbed water was removed from an adsorbent consisting essentially of freshly prepared silica gel by vacuum treating at 5 mm. Hg absolute pressure and 350° F. for one hour. A solution consisting of 10% benzene and 90% normal heptane was passed at room temperature through a column containing a portion of the silica gel thus prepared. Non-adsorbed constituents were removed from the bottom of the column. Refractive indices of portions of this bottom effluent were periodically measured. After 101 cc. of the bottom effluent were collected, the refractive index began to increase rapidly, indicating that benzene was beginning to appear in the bottom effluent. This volume was adopted as the measure of the gel's maximum adsorption activity. Thus 101 cc. of non-aromatic bottom effluent was taken as equivalent to 100% activity; 0 cc. of non-aromatic bottom effluent corresponded to 0 activity, and the relation was assumed to be linear between these limits.

Portions of the remainder of the vacuum treated gel were heated to elevated temperatures, such as about 1400° F., for prolonged periods, such as about eight hours, thus reducing the water content substantially below four percent. The activities of these dehydrated gel portions were measured by adsorbing benzene from heptane solution at room temperature as described above. For example, where with one gel portion 22 cc. of non-aromatic bottom effluent were obtained, a gel activity of 22% was thereby indicated.

Portions of dehydrated gel were treated with water or with aqueous hydrochloric acid of concentrations as indicated in the table below. The time and temperature of treatment are indicated for each case. In each case, after the indicated time, the water or acid solution was drained off and the gel subjected to a vacuum of 5 mm. Hg and temperature of 350° F. for one hour. Where acid was used, the gel was washed with water before vacuum treating. The activities of the gels before and after aqueous treatment are shown in the table for each run.

| Run No. | Concentration of aqueous HCl in percent HCl | Time of contact in hours | Temperature of contact in °F. | Adsorption activity in percent before aqueous treatment | Adsorption activity in percent after aqueous treatment | Increase in activity, percent |
| --- | --- | --- | --- | --- | --- | --- |
| 1 | 0 | 21 | 72 | 22 | 40 | 18 |
| 2 | 0 | 0.085 | 72 | 25 | 28 | 3 |
| 3 | 0 | 0.5 | 212 | 25 | 28 | 3 |
| 4 | 0 | 1 | 72 | 27 | 39 | 12 |
| 5 | 3.6 | 1 | 72 | 27 | 44 | 17 |
| 6 | 3.6 | 1 | 72 | 22 | 37 | 15 |
| 7 | 3.6 | 2 | 72 | 22 | 38 | 16 |
| 8 | 3.6 | 2 | 150 | 22 | 37 | 15 |
| 9 | 3.6 | 6 | 72 | 22 | 41 | 19 |
| 10 | 3.6 | 18 | 72 | 22 | 41 | 19 |
| 11 | 36 | 6 | 72 | 22 | 41 | 19 |

Comparison of run 4 with runs 2 and 3 shows that the second half hour of contact time brings about a much greater increase in activity than the first half-hour. The increase in activity obtained with water as the treating agent in half an hour is not substantial; but extension of the time of contact beyond half an hour results in larger increases of activity which are substantial.

Runs 6, 8, 9, and 10 show that there is little or no advantage in employing a contact time longer than six hours.

Comparison of runs 4 and 5 shows that with a one hour contact time, hydrochloric acid gives a greater degree of reactivation than does water at the same temperature. It is to be noted, however, that in run 5, the effective contact time was somewhat greater than one hour, because wash water was in contact with the gel beyond the one hour period.

Comparison of the results of runs 9 and 11 shows that when acid concentrations of at least 3.6% are used, considerable increase in the concentration has no effect on the gel activity.

Comparison of runs 7 and 8 shows that temperature has little, if any effect on the degree of reactivation.

Runs 5 and 6 show that the extent to which a gel may be reactivated depends to a certain extent on the degree of dehydration to which it has been reduced.

This application is a continuation-in-part of my co-pending application, Serial No. 85,939, filed April 6, 1949, and now abandoned.

I claim:

1. In a selective adsorption method wherein silica gel is contacted with organic material to effect adsorption of at least one component thereof and is subsequently heated above 400° F. to remove organic contaminants therefrom, the improvement which comprises contacting the resulting silica gel with water in liquid phase containing 0 to 45 percent by weight of hydrogen chloride at a treating temperature below 400° F. for a period of at least half an hour, and subsequently heating said silica gel under vacuum to a temperature below 400° F. to remove water other than structurally combined water, thereby to increase the activity of said silica gel for further use as adsorbent.

2. Method according to claim 1 wherein said treating temperature is not above 212° F.

3. Method according to claim 1 wherein said first-named water contains 0.1 to 45% by weight of hydrogen chloride.

4. Method according to claim 1 wherein said period is one to six hours.

5. Method according to claim 1 wherein said treating temperature is ordinary temperature without heating.

6. Method according to claim 1 wherein the first-named water contains hydrogen chloride, and wherein said treated silica gel is washed with hydrogen-chloride-free water before heating under vacuum.

7. Method according to claim 1 wherein said organic material is a mixture of liquid organic materials, at least one of which is selectively adsorbed on said silica gel.

8. Method according to claim 1 wherein the first-named water is essentially free of hydrogen chloride.

References Cited in the file of this patent

UNITED STATES PATENTS

| | | |
|---|---|---|
| 2,246,900 | Schulze et al. | June 24, 1941 |
| 2,395,491 | Mavity | Feb. 26, 1946 |
| 2,470,339 | Claussen et al. | May 17, 1949 |

OTHER REFERENCES

Shapiro et al.: J. Am. Chem. Soc. 72, pages 776–782 (1950).

Kautsky et al.: Naturforsch., 7b, page 414 (1952).

Chromatographic Adsorption and Silica Gel (1946), pages 3 and 4, The Davision Chem. Corp., Balt. 3, Md.

The Science of Petroleum, vol. 3, Oxford University Press (1938), London, pages 1703 and 1704.

Adsorption, Mantell, McGraw-Hill Co., New York (1945), p. 176.